United States Patent

[11] 3,621,289

[72] Inventor Sadao Sasaki
Yokohama-shi, Japan
[21] Appl. No. 796,630
[22] Filed Dec. 6, 1968
[45] Patented Nov. 16, 1971
[73] Assignee Tokyo Shibaura Electric Co. Ltd.
Kawasaki-shi, Japan
[32] Priority Dec. 12, 1967
[33] Japan
[31] 42/79248

[54] MASTER-SLAVE TYPE J-K FLIP-FLOP CIRCUITS COMPRISED BY CURRENT SWITCHING TYPE LOGICAL CIRCUITS
8 Claims, 4 Drawing Figs.

[52] U.S. Cl. .......... 307/247, 307/289, 307/291, 328/206
[51] Int. Cl. .......... H03k 17/00, H03k 3/26
[50] Field of Search .......... 307/247, 291, 289, 292; 328/206

[56] References Cited
UNITED STATES PATENTS
3,440,449 4/1969 Priel .......... 307/291

*Primary Examiner*—Donald D. Forrer
*Assistant Examiner*—David M. Carter
*Attorney*—Irving M. Weiner ABSTRACT: A master-slave type J-K flip-flop circuit comprising a master flip-flop circuit-producing outputs Qm, $\overline{Qm}$ and a slave flip-flop circuit-producing outputs Qs, $\overline{Qs}$. The master flip-flop circuit includes a first set input circuit having a current-switching type logical circuit which performs an AND operation of an input J and clock Cp in reference to the output Qs and a first reset input circuit having a current-switching type logical circuit which performs and AND operation of an input K and clock Cp in reference to the output Qs. The slave flip-flop circuit includes a second set input circuit having a current-switching type logical circuit which executes a current-switching operation of the clock Cp in reference to the output Qm and a second reset input circuit having a current-switching type logical circuit which executes a current-switching operation of the clock Cp in reference to the output Qm.

MASTER-SLAVE TYPE J-K FLIP-FLOP CIRCUITS COMPRISED BY CURRENT SWITCHING TYPE LOGICAL CIRCUITS

The present invention relates to a current-switching type logical circuit for use in computers, etc. and particularly to a master-slave-type J—K flip-flop suitable for semiconductor integrated circuits and having no biassing circuit for providing a reference potential.

In the conventional set-reset flip-flop when a trigger pulse is concurrently applied to the set and reset input sides thereof, the content and thus the output of the flip-flop are caused to be unstable. In order to avoid such an unstable condition there has been proposed a flip-flop in combination with a RC differentiating circuit provided in an input gate circuit. In the arrangement, the content of the flip-flop immediately before the entrance of trigger pulses is stored in a capacitor, and when the trigger pulse is entered a determination is made as to which of two gates the pulse is distributed. In making such a flip-flop in the IC (integrated circuit) form, however, it is easier from the standpoint of its required area to provide active elements, such as transistors, than to provide a capacitor. Thus, attention has been directed toward J—K flip-flops.

In place of such a capacitor for storing the content of a flip-flop immediately before the entrance of trigger pulses, a master flip-flop is provided according to the present invention, and a slave flip-flop is thus operated in accordance with the content of the master flip-flop.

In the logical circuit of such prior art, RTL, DTL, TTL and CML are increased, in operation speed, in their order. According to the present invention a master-slave-type J—K flip-flop is constructed using a high speed CML (Current Mode Logic), i.e., current-switching type logical circuit.

In a master-slave-type J—K flip-flop using conventional current-switching type logical circuits, it is essentially required to provide a biassing circuit for obtaining a threshold voltage, i.e., a reference potential. In the master-slave-type J—K flip-flops of the present invention, however, there can be used a current-switching type logical circuit without the need for any biassing circuit.

A J-K flip-flop circuit is a circuit-having clock, J and K inputs, and wherein a clock pulse is effective to trigger the circuit from its reset to its set state only in the presence of a signal at the J input and to trigger the circuit from its reset to its set state only in the presence of a signal at the J input and to trigger the circuit from its set to its reset state only in the presence of a signal at the K input.

There has been proposed a master-slave-type J—K flip-flop circuit comprising a master flip-flop circuit and a slave flip-flop circuit, each having first and second current-switching type logical circuits which constitute set and reset input circuits respectively, a third current-switching type logical circuit providing the flip-flop operation in response to outputs from the first and second current-switching type logical circuits and a bias circuit to provide a reference potential to the first and second current-switching type logical circuits to cause them to effect logical operations. However, provision of such an independent bias circuit requires a large number of circuit elements, thus resulting not only in the complication of the circuit construction but also in the increase in the power consumption. The large number of circuit components required is especially disadvantageous where the flip-flop circuits are in integrated circuit form.

A current-switching type logical circuit is a logical circuit wherein, when the circuit is changed from one state to the other, a current is switched from one path to another.

Accordingly, the principal object of this invention is to provide a new and improved master-slave-type J—K flip-flop circuit comprised by current-switching circuits capable of providing an appropriate reference potential without the necessity of providing an independent bias circuit.

A further object of this invention is to provide a master-slave-type J—K flip-flop circuit having simple construction and requiring lesser power consumption.

Still further object of this invention is to provide a master-slave-type J—K flip-flop circuit especially suitable to be used in integrated circuits.

This invention is based on the conception that the master flip-flop circuit and the slave flip-flop circuit are never be set or reset simultaneously and in accordance with this invention, the reference potential for the master flip-flop circuit is derived out from the output of the slave flip-flop circuit whereas that for the slave flip-flop circuit is derived out from the output of the master flip-flop circuit, thus eliminating the necessity of providing an independent bias circuit for the reference potential. Thus, the master-slave-type J—K flip-flop circuit comprised by current switching type logical circuits has simple construction and can be applied to integrated circuits with advantages.

This invention can be more fully understood from the following description when taken in connection with the accompanying drawings, in which.

In this invention, a logical operation will be described as positive logic. But it will be understood by those skilled in the art that the logical operation may be equivalently performed also by negative logic.

Figure 1:
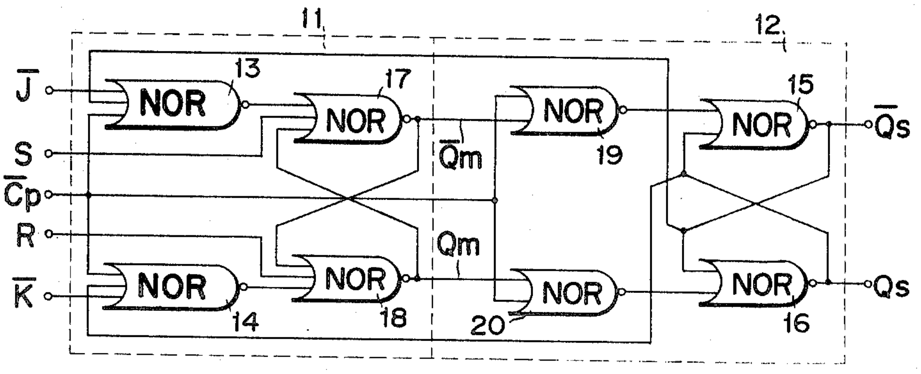
FIG. 1 shows a connection diagram to explain the principle of a master-slave-type J—K flip-flop circuit constructed in accordance with this invention.

The master-slave type flip-flop circuit diagrammatically illustrated in FIG. 1 includes a master flip-flop circuit 11 bounded by a dotted line rectangle and to which inputs J and K are supplied and a slave flip-flop circuit 12 connected to receive outputs from flip-flop circuit 11. Two NOR-circuits 13 and 14 in the master flip-flop circuit 11 are connected to respectively receive inputs $\overline{J}$ and $\overline{K}$ together with a clock pulse $\overline{Cp}$. Further, as the third input, outputs $\overline{Qs}$ and Qs from NOR-circuits 15 and 16 of the slave flip-flop circuits 12 are applied to NOR-circuits 13 and 14. A set input S and a reset input R are applied to NOR-circuits 17 and 18 respectively, and their outputs $\overline{Qm}$ and Qm are applied to the input of the other NOR-circuit 18 or 17, respectively, and also to NOR-circuits 19 and 20 of the slave flip-flop circuit 12. NOR-circuits 19 and 20 also receive said clock pulse $\overline{Cp}$ and their outputs are applied to the inputs of NOR-circuits 15 and 16. Outputs $\overline{Qs}$ and Qs of NOR-circuits 15 and 16 are applied to the input of the other NOR-circuit, 16 or 15, respectively. The circuits 17 and 18 form a flip-flop circuit, as do the circuits 15 and 16. In this disclosure, it will be understood that a NOR function is operated in positive logic. But in negative logic, the NOR function in positive logic will be understood as a NAND function.

Figure 2:
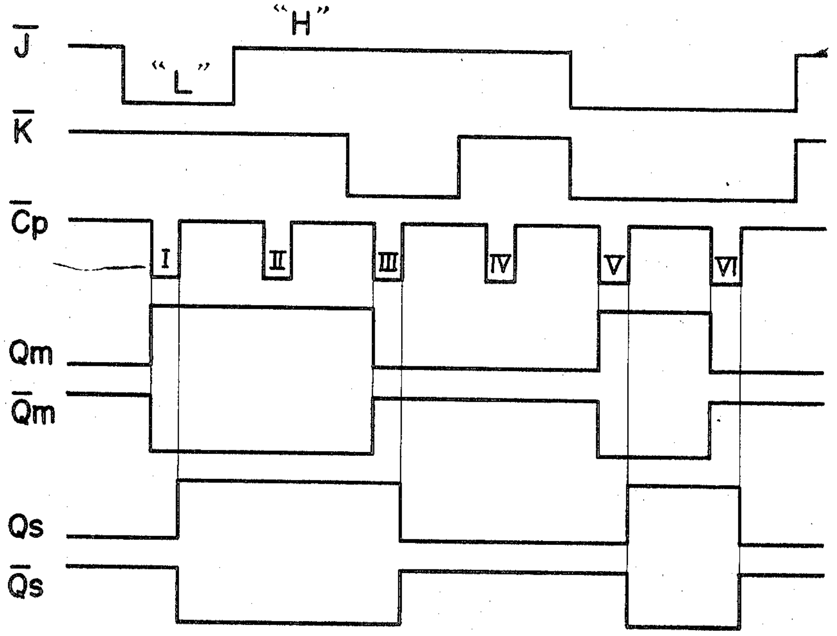
FIG. 2 shows waveforms to explain the operation of the flip-flop circuit shown in FIG. 1.

The above described various signals $\overline{J}$, $\overline{K}$, $\overline{Cp}$, Qm, $\overline{Qm}$, Qs and $\overline{Qs}$ have a mutual relation as shown in FIG. 2. In the following, the operation of the circuit shown in FIG. 1 will be considered with reference to FIG. 2. First, it is assumed that $\overline{J}$=$\overline{K}$=$\overline{Cp}$="H" (high potential), Qm=Qs="L" (low potential) and $\overline{Qm}$=$\overline{Qs}$="H", in other words, both master flip-flop circuit 11 and slave flip-flop circuit 12 are in their reset condition. Under this condition, when clock pulse $\overline{Cp}$ changes to the condition I as shown in FIG. 2, NOR-circuit 14 will provide an output which is coupled to NOR-circuit 18, thus switching output Qm therefrom to a state of "H." Due to this switching of the output from NOR-circuit 18 to state "H," the output $\overline{Qm}$ from NOR-circuit 17 will be switched to a state of "L," thus setting the master flip-flop circuit 11.

At this time, in the slave flip-flop circuit 12, owing to the switching of clock pulse $\overline{Cp}$ from "L" to "H" state, the output Qs from NOR-circuit 16 is switched from "L" to "H" state by the output from NOR-circuit 20 and at the same time the output $\overline{Qs}$ of NOR-circuit 15 is switched from "H" to "L" state. In this manner, the slave flip-flop circuit 12 is reset.

Outputs $\overline{Qs}$ from the slave flip-flop circuit 12 is applied to NOR-circuit 13 of master flip-flop circuit 11 whereas output Qs is applied to NOR-circuit 14. Nevertheless, the master flip-flop circuit is maintained in its set state. Even if signal $\overline{J}$ changes to "H" state and clock pulse $\overline{Cp}$ to "L" state as shown by the condition II shown in FIG. 2, there will be no change in the circuits.

Further, when signal $\overline{K}$ changes to "L" state followed by the change of clock pulse signal $\overline{Cp}$ to the condition III of FIG. 2, in the same manner as the set operation described above, master flip-flop circuit 11 first changes to its reset state and then the clock pulse $\overline{Cp}$ to "H" state, thus concurrently resetting slave flip-flop circuit 12. This condition is continued until clock pulse $\overline{Cp}$ reaches a condition V shown in FIG. 2. When the clock pulse $\overline{Cp}$ is brought to the condition of V, the signal Qs assumes a value "L" and the signal $\overline{Qs}$ a value "H." Accordingly, set operation is carried out in the same manner as when the clock pulse $\overline{Cp}$ is in the state of I. When the clock pulse is brought to the condition of VI the signal Qs has a value "H" and the signal $\overline{Qs}$ a value "L." Thus reset operation is performed in the same manner as when the clock pulse $\overline{Cp}$ is in the state of III.

The NOR circuits shown in FIG. 1 represent logical circuits that perform NOR operations, for particular inputs but do not perform always the same operations for any indefinite inputs. This will become clear from the embodiments of this invention to be described later.

Figure 3:
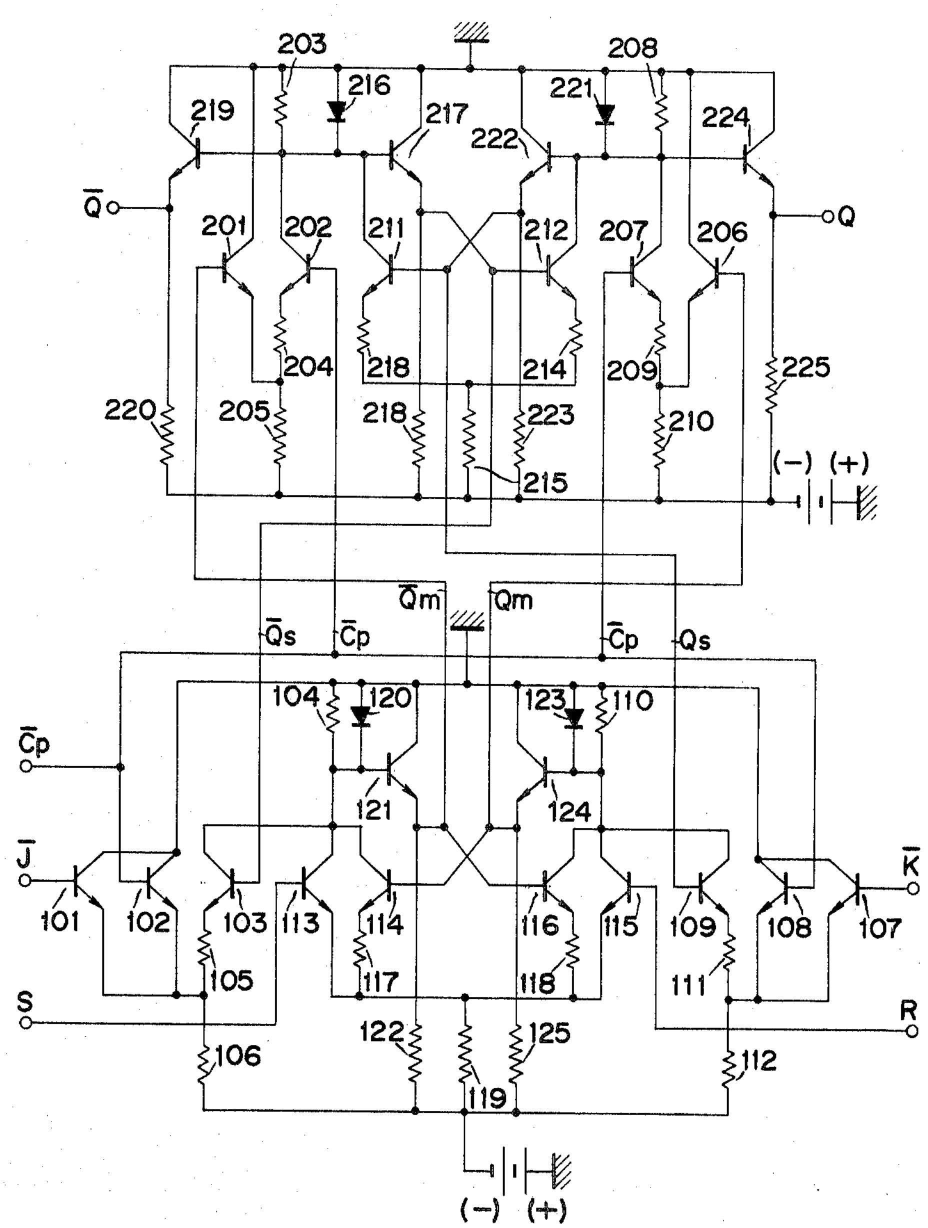
FIG. 3 shows a connection diagram of one embodiment of this invention.

Referring now to FIG. 3, a master flip-flop circuit is shown as comprising first, second, and third current-switching type logical circuits. The first current-switching type logical circuit which is connected to the input side of a flip-flop circuit to be described later comprises three transistors 101, 102, and 103 and three resistors 104, 105, and 106. Transistors 101 and 102 form an AND input gate and the whole of first current-switching type logical circuit provides an AND input. The base electrode of the transistor 101 is supplied with an input [$\overline{J}$] as shown in FIG. 2 while the base electrode of the transistor 102 is supplied with a clock pulse [$\overline{Cp}$]. The base electrode of the transistor 103 is energized by the output $\overline{Qs}$ as reference potential from the slave flip-flop circuit. The second current-switching type logical circuit on the reset side of said flip-flop circuit is constructed identically to the first current-switching type logical circuit and comprises transistors 107, 108 and 109 and resistors 110, 111 and 112. The transistors 107 and 108 form an AND input gate and the whole of second current-switching type logical circuit comprises an AND input. The base electrode of transistor 107 is supplied with an input [$\overline{K}$], that of the transistor 108 with the clock pulse [$\overline{Cp}$] and that of the transistor 109 with the output [Qs] as reference potential from the slave flip-flop circuit.

The third current-switching type logical circuit provides flip-flop operations. This circuit includes said resistors 104 and 110 which are also included in the first and second logical circuits. In addition to these resistors, the third logical circuit comprises transistors 113, 114, 115 and 116 and resistors 117, 118 and 119. The output $\overline{Qm}$ of the master flip-flop circuit is provided from commonly connected collector electrodes of the transistors 113 and 114 through an emitter-follower circuit comprising a diode 120, a transistor 121 and a resistor 122. Said diode 120 is provided as a potential limiter for the base transistor 121 when the current flows through resistor to both transistors 103 and 114. An NPN-transistor of which collector and base are commonly connected may be also used as the said diode 120. The output Qm is supplied to the base electrode of transistor 116. Similarly, the output [Qm] of the master flip-flop circuit is provided from commonly connected collector electrodes of the transistors 115 and 116 through another emitter-follower circuit comprising a diode 123, a transistor 124 and a resistor 125. The output $\overline{Qm}$ is supplied to the base electrode of the transistor 114. Outputs [$\overline{Qm}$] and [Qm] are also applied to a slave flip-flop circuit to be described later. In order to independently set and reset the flip-flop circuit formed by the third logical circuit without utilizing any clock pulse, set inputs [S] are applied to the base electrode of transistor 113 and reset inputs [R] are applied to the base electrode of transistor 115.

The slave flip-flop circuit is constructed substantially in the same manner as said master flip-flop circuit and comprises first, second and third current-switching type logical circuits.

The first current-switching type logical circuit on the set side of the slave flip-flop circuit comprises transistors 201 and 202 and resistors 203, 204 and 205. The base electrode of the transistor 201 is energized by the output Qm as reference potential from the master flip-flop circuit while the base electrode of the transistor 202 is energized by the clock pulse [$\overline{Cp}$]. Similarly, the second current switching type logical circuit on the reset side of the slave flip-flop circuit comprises by transistors 206 and 207 and resistors 208, 209 and 210. The base electrode of transistor 206 is energized by the output Qm as reference potential from the master flip-flop circuit while that of transistor 201 is energized by the clock pulse [Cp].

The third current-switching type logical circuit that comprises the flip-flop circuit includes transistors 211 and 212 and resistors 213, 214, and 215 in addition to said resistors 203 and 208 which are also included in the first and second logical circuits and provide the flip-flop operation.

The output $\overline{Qs}$ is obtained from the collector electrode of the transistor 211 through an emitter-follower circuit comprised by a diode 216, a transistor 217 and a resistor 218, said output [$\overline{Qs}$] being applied to the base electrode of the transistor 212. An emitter-follower circuit including a transistor 219 and a resistor 220 functions to provide output [$\overline{Q}$] of the master-slave-type J—K flip-flop circuit of this embodiment, it being noted that outputs [$\overline{Q}$] and [$\overline{Qs}$] are identical. Output [Qs] is obtained from the collector electrode of the transistor 212 through an emitter-follower circuit including a diode 221, a transistor 222 and a resistor 223. The output Q is supplied to the base electrode of the transistor 211.

Furthermore, an emitter-follower circuit comprising a transistor 224 and a resistor 225 provides output [Q] of the master-slave-type J—K flip-flop circuit of this embodiment, it being understood that output is identical to output [Qs] from the slave flip-flop circuit which is supplied to the AND input gate of the master flip-flop circuit.

The operation of the master-slave-type J—K flip-flop circuit shown in FIG. 1 will now be considered by referring to various waveforms shown in FIG. 2.

Assuming now that [$\overline{J}$]=[$\overline{K}$]=[$\overline{Cp}$]="H" (high potential), and that [Qm]=[Qs]="L" (low potential) and that [$\overline{Qm}$]=[$\overline{Qs}$]="H," that is the master flip-flop and the slave flip-flop circuits are in their reset state. Under these conditions, in the master flip-flop circuit, transistor 116 is in its ON state and in the slave flip-flop circuit, transistor 212 is in its ON state. At first, input $\overline{J}$ becomes L and when the clock pulse [$\overline{Cp}$] becomes the state "I" shown in FIG. 2, the current that has been flowing through transistor 102 will be switched to the current flowing through transistor 103 to create a voltage drop across the resistor 104 whereby the output [$\overline{Qm}$] becomes "L" (low potential). This is because the input $\overline{J}$ causes "L" potential to be applied to the base of the transistor 101, and the clock pulse $\overline{Cp}$ also causes "L" potential to be applied to the base of the transistor 102. On the other hand, to the base of the transistor 103 has been applied "H" potential as a reference potential by the output $\overline{Qs}$ of the slave flip-flop. Then, the transistor 103 turns ON after a current-switching operation is executed with the transistors 101 and 102. On this performance, it will be noted that before the clock pulse $\overline{Cp}$ becomes "L" potential, each base of the transistors 102 and 103 are biased to "H" potential. This condition usually makes the current-switching operation of the transistors 102 and 103 nonsteady state. But in this embodiment, the existence of the resistor 105 makes that steady state. This is because the resistor 105 shifts the potential of the emitter of the transistor 103 against that of transistor 102. Then, one transistor 102 turns ON, and another transistor 103 cuts OFF because of the resistor 105. In such manner, the current flowing through transistor 102 will be switched to that through transistor 103.

As a result, transistor 116 becomes OFF to render the transistor 114 ON by positive feedback thus switching the current from transistor 116 to the transistor 114. In this manner the master flip-flop circuit is set. At this time, in the slave flip-flop circuit, the base potential of transistor 202 is "L" and that of transistor 201 changes from "H" to "L." However owing to the presence of resistor 204, nearly all amount of the current through resistor 205 continues to flow through the transistor 201 so that output [$\overline{Qs}$] will not be varied. On the other hand, the base potential of transistor 206 changes from "L" to "H" thus causing the current through resistor 210 to flow through transistor 206. However, as the current has been flowing through transistor 212, again the output [Qs] will not be varied. At this time, when the clock pulse changes from "L" to "H," in the master flip-flop circuit, the current that has been flowing through transistor 103 will be switched to flow through transistor 102 by the presence of resistor 105 in spite of the fact that the base potential of transistor 103 is "H." However, as current is flowing through transistor 114, the output [Qm] and the NOT output [$\overline{Qm}$] will not be changed.

In the slave flip-flop circuit, however, when the base potential of transistor 202 is "H," that of the transistor 201 is "L" so that the current that has been flowing through transistor 201 will be switched to flow through transistor 202 with the result that the NOT output [$\overline{Qs}$] will become "L". On the other hand, the base potential of transistor 206 is "H" and when the clock pulse [$\overline{Cp}$] becomes "H" the base potential of transistor 207 will also become "H." However, owing to the presence of resistor 209 the current passing through resistor 210 will flow through transistor 206. By the positive feedback provided by this loop circuit the output [Qs] becomes "H" to set the slave flip-flop circuit.

The output [Qs] from the slave flip-flop circuit will bring the base potential of transistor 109 of the master flip-flop circuit to "H," but the base potential of transistor 108 is "H" and owing to the presence of resistor 111, the current passing through resistor 112 will continue to flow through transistor 108. In the same manner, although the output [$\overline{Qs}$] turns OFF transistor 103, since nearly all portion of the current through resistor 106 has been flowing through transistor 102, the condition of the master flip-flop circuit would not be changed.

At this time, when the input [$\overline{J}$] changes to "H" transistor 101 will be turned ON, but since transistor 102 has been ON state, the condition of the master flip-flop circuit will not be effected in any way.

When the clock pulse [$\overline{Cp}$] assumes a condition "II" shown in FIG. 2, in the master flip-flop circuit, since [$\overline{J}$]=[$\overline{K}$]="H", no current-switching operation is effected. Also in the slave flip-flop circuit, when the clock pulse [$\overline{Cp}$] becomes "L" under a condition of [$\overline{Qm}$]="L" the current will be switched to transistor 201 from transistor 202, since the current has been flowing through transistor 211, the output [$\overline{Qs}$] will not be varied. Since the base potential of transistor 206 is "H" this current-switching type logical circuit does not provide any current-switching operation with the result that the slave flip-flop circuit does not change its state.

When the clock pulse [$\overline{Cp}$] assumes a condition "III" shown in FIG. 2, the master-slave-type J—K flip-flop circuit will be reset in the same manner as said setting operation.

In the case, where the clock pulse assumes a condition "IV," the state of the flip-flop circuit will now be effected. But when the clock pulse [$\overline{Cp}$] assumes a condition "V" then, since [Qs]="L" and [$\overline{Qs}$]="H," the content of the flip-flop circuit will be reversed thus effecting a setting operation as in the condition "I."

At a condition "VI" of the clock pulse [$\overline{Cp}$], since [Qs]="H" and [$\overline{Qs}$]="L," again the content of the flip-flop circuit is reversed to provide similar resetting operation as in condition "III."

As described above, the master and slave flip-flop circuit are never set or reset at the same time. Therefore, the master flip-flop could execute the switching operation in reference to the outputs Qs and $\overline{Qs}$ of the slave flip-flop. The slave flip-flop could also execute the switching operation in reference to the outputs Qm and $\overline{Qm}$ of the master flip-flop.

In other words, the master flip-flop circuit could execute the set and reset operation, if both inputs $\overline{J}$ and $\overline{K}$ were applied at the same time. In the master flip-flop, a set input circuit including a first current switching type logical circuit performs the AND operation of the inputs $\overline{J}$ and $\overline{Cp}$ in reference to the output $\overline{Qs}$, and a reset input circuit including a second current-switching type logical circuit performs also the AND operation of the inputs $\overline{K}$ and $\overline{Cp}$ in reference to the output Qs. On this performances, the outputs Qs and $\overline{Qs}$ of the slave flip-flop are maintained at the previous states of the master flip-flop without being changed by the present inputs $\overline{J}$ and $\overline{K}$. The, one of these inputs $\overline{J}$ and $\overline{K}$ would be enabled to set or reset a flip-flop circuit of the master flip-flop according to Qs and $\overline{Qs}$, when both inputs $\overline{J}$ and $\overline{K}$ would be applied. Thus, a flip-flop circuit including a third current-switching type logical circuit changes its state responding to the set and reset input circuit. In respect to this master flip-flop operation, there is no fixed reference potential to perform a current switching operation. Instead of the fixed reference potential, the outputs Qs and $\overline{Qs}$ are used as reference potentials to perform AND operations.

The slave flip-flop also acts like a master flip-flop. In the slave flip-flop, a set input circuit including a first current switching type logical circuit executes the switching operation of a clock pulse $\overline{Cp}$ in reference to an output $\overline{Qm}$ of the master flip-flop, and a reset input circuit including a second current-switching type logical circuit executes the switching operation of the clock pulse $\overline{Cp}$ in reference to output Qm of the master flip-flop. On these executions, the outputs Qm and $\overline{Qm}$ representing a new state of the master flip-flop designate a flip-flop circuit including a third current-switching type logical circuit how to set or reset. Then, this flip-flop circuit responding to the set and reset input circuit changes its state for providing outputs Q and Q of the J—K flip-flop.

Figure 4:
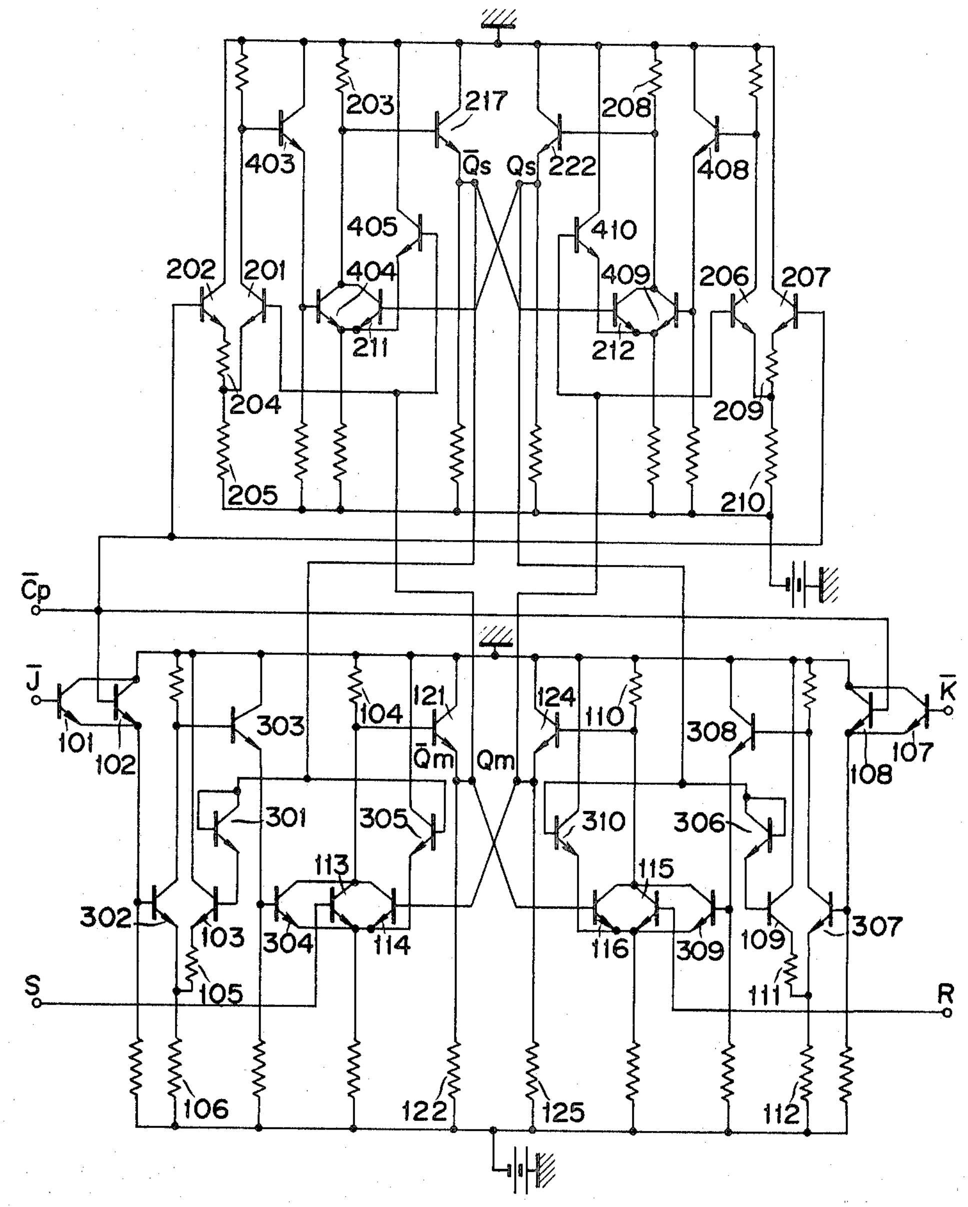
FIG. 4 shows a connection diagram of a modified embodiment of this invention.

FIG. 4 shows a modified embodiment of this invention in which like reference numerals indicate similar elements as in FIG. 3.

In order to set or reset the master flip-flop circuit, set input S is applied to the base of transistor 113 from a set terminal and reset input R is applied to the base electrode of transistor 115 from a reset terminal. The first current-switching type logical circuit on the set input side of the master flip-flop circuit comprises an emitter follower transistor 101 connected to receive input $\overline{J}$, an emitter-follower transistor 102 to receive clock pulse $\overline{Cp}$, a transistor 103 connected to receive slave flip-flop output $\overline{Qs}$ as reference potential through a transistor 301 which is connected as a diode and transistor 302 connected between transistors 102 and 103. Current-switching operation is effected between transistor 302 and a transistor 103 which is serially connected with a current-limiting resistor 105. The output from this first current-switching type logical circuit is applied to the base electrode of a transistor 304 via an emitter-follower transistor 303. Current-switching operation is effected between one of transistors 113, 114 and 304 and a transistor 305 which is connected to receive output Qs from the slave flip-flop circuit. Further, the output from the OR circuit formed by transistors 113, 114 and 304 is applied to an emitter follower transistor 121 to provide an output $\overline{Qm}$ therefrom, which is applied to the base electrode of transistor 116 and to the base electrodes of transistors 201 and 405 of the slave flip-flop circuit.

The second current-switching type logical circuit on the reset input side of the master flip-flop circuit has a construction identical to that of the first current-switching type logical circuit. More particularly, input $\overline{K}$ is applied to an emitter-follower transistor 107, clock pulse input $\overline{Cp}$ to the base electrode of an emitter-follower transistor 108 and reset input R to the base electrode of transistor 115. The output of an AND circuit comprising transistors 107 and 108 is applied to a transistor 309 via transistors 307 and 308 while the output from an OR circuit comprising transistors 115, 116 and 309 is applied to an emitter-follower transistor 124 to obtain an output Qm, which is applied to the base electrode of transistor 114 and to the base electrodes of transistors 206 and 410 of the slave flip-flop circuit. The third current-switching type logical circuit which operates the master flip-flop circuit of this embodiment comprises the transistors 113, 114, 304 and 305 and the transistors 115, 116, 309 and 310.

The fundamental construction of the slave flip-flop circuit is substantially the same as that of the master flip-flop circuit. The difference between them is that $\bar{J}$ and $\bar{K}$ inputs, set input S and reset input R are applied to the master flip-flop circuit whereas no such input is applied to the slave flip-flop circuit. Thus, it is believed unnecessary to describe the detail of construction of the latter circuit.

The operation of the circuit shown in FIG. 4 will now be considered with reference to FIG. 2. Assume now that $\bar{J}=\bar{K}=\overline{Cp}$="H" (high potential), Qm=Qs="L" (low potential) and $\overline{Qm}=\overline{Qs}$="H." In other words, both of the master flip-flop circuit and the slave flip-flop circuit are assumed to be in their set condition. Accordingly, in the master flip-flop circuit, transistor 114 is in OFF state, transistor 116 is ON, transistor 305 is ON and transistor 310 is in OFF state. In the slave flip-flop circuit, transistor 211 is in OFF state, transistor 212 is ON, transistor 405 is ON and transistor 410 is in OFF state.

Under these conditions, when clock pulse $\overline{Cp}$ assumes a condition "I" (low voltage) shown in FIG. 2, the current that has been flowing through transistor 320 will be switched to transistor 103 because input $\bar{J}$ and $\overline{Cp}$ are at a low potential. As transistor 302 turns OFF, transistor 304 becomes ON. This condition of transistor 304 causes a current to flow through resistor 104 to decrease the base potential of transistor 121 to vary output $\overline{Qm}$ from "H" to "L" state. Consequently, transistor 116 becomes OFF to interrupt current through resistor 110. As a result transistor 310 becomes ON to change output Qm to "H" state, which is effective to render transistor 114 conductive, thus setting the master flip-flop circuit.

Under these conditions, in the slave flip-flop circuit, although the base potential of transistor 202 is at "L" state and the base potential of transistor 201 is varied from "H" to "L" state, the current through resistor 205 flows through transistor 201 owing to the presence of resistor 204, so that output $\overline{Qs}$ will maintain "H" state. As the base potential of transistor 206 changes from "L" to "H" state, current through resistor 210 flows through transistor 206. Since transistor 212 has been ON condition, output Qs will be maintained at "L" state.

As clock pulse $\overline{Cp}$ changes from "L" to "H" state, in the master flip-flop circuit, current will be switched from transistor 103 to transistor 302 because of the presence of resistor 105 irrespective of the fact that the base potential of transistor 103 is in "H" state. However, since transistor 114 is in its ON condition, both outputs $\overline{Qm}$ and Qm do not vary. In the slave flip-flop circuit, since the base potential of transistor 202 changes to "H" state and that of transistor 201 is at "L" state, the current is switched from transistor 201 to transistor 202, whereby transistor 404 becomes conductive to pass current through resistor 203. Thus, output $\overline{Qs}$ changes from "H" to "L" state. At this time, the base potential of transistor 206 is at "H" state and that of transistor 207 is also at "H" state so that current flows through transistor 206 because of the presence of resistor 209 to turn transistor 409 to its OFF condition. As transistor 212 is OFF, transistor 222 becomes ON to change output Qs from "L" to "H" state thus setting the slave flip-flop circuit.

Output Qs from the slave flip-flop circuit while it is at "H" state is applied to the base electrode of transistor 310 of the master flip-flop circuit and also to the base electrode of transistor 109 via transistor 306. The purpose of providing transistor 306 is to equalize the potential of signals applied to base electrodes of transistors 109 and 307. More particularly, in this embodiment, as clock pulse $\overline{Cp}$ and $\bar{K}$ input are not applied directly to the base electrode of transistor 307 but instead to the base electrodes of transistors 107 and 108, the input signal level of the base electrode of transistor 307 is lower than the level of input signal $\overline{Cp}$ and $\bar{K}$ because of the presence of the drop of the forward voltage between base and emitter of transistors 107 and 108. If output Qs is applied directly to the base electrode of transistor 109, signals Qs and Cp cannot provide a satisfactory current-switching operation between transistors 109 and 307. For this reason, in order to compensate for the unbalance of potential, transistor 306 is utilized in the form of a diode with its collector and base electrodes directly interconnected. The reason for utilizing as a diode transistor 306 with its collector and base electrodes interconnected is to facilitate the fabrication of this embodiment as an integrated circuit. Since the circuit does not contain any diode, it is easier to manufacture and to provide uniform characteristics when all semiconductor elements are fabricated as transistors than to fabricate diodes by additional process steps. Since integrated circuits usually employ silicon substrates, NPN-type transistors are preferred.

Referring again to the description of the operation, while transistor 109 becomes ON by the output Qs of "H" state, because the base potential of transistor 307 is at "H" state and because of the presence of resistor 111, the current continues to flow through transistor 307. Similarly, although output $\overline{Qs}$ at "L" state brings the base potential of transistor 103 to "L" state, and hence transistor 302 becomes ON and 304 OFF, since the current has been flowing through transistor 114, the condition of the master flip-flop circuit does not change.

When input $\bar{J}$ changes to "H" state, the base potential of the transistor 302 has been already "H" potential, the condition of the master flip-flop circuit does not change.

When clock pulse $\overline{Cp}$ assumes condition II as shown in FIG. 2, in the master flip-flop circuit, since $\bar{J}=\bar{K}$="H" no current-switching operation is effected. Also in the slave flip-flop circuit, when $\overline{Qm}$ is at "L" state and when $\overline{Cp}$ changes to "L" state current is switched from transistor 202 to transistor 201. However, as transistor 211 is in its ON condition $\overline{Qs}$ maintains its "L" state. Because as the base potential of transistor 206 is at "H" state, the current-switching type logical circuit does not perform its current-switching operation. For this reason, also the condition of the slave flip-flop circuit does not change.

When clock pulse $\overline{Cp}$ assumes condition III shown in FIG. 2, the master and slave flip-flop circuits will be reset in the same manner as has been described above in connection with their setting operation.

When clock pulse $\overline{Cp}$ assumes condition IV, both master and slave flip-flop circuits are maintained in their reset condition. However, when clock pulse $\overline{Cp}$ reaches condition V, Qs is at "L" state and $\overline{Qs}$ at "H" state so that contents of both flip-flop circuits are inverted thus performing setting operation in the same manner when $\overline{Cp}$ was at I.

Further, when clock pulse $\overline{Cp}$ assumes condition VI, since Qs is at "H" state and $\overline{Qs}$ is at "L" state the contents of the flip-flop circuits are again reversed to provide a resetting operation in the same manner when $\overline{Cp}$ was III.

The master and slave flip-flop circuits in the embodiments shown in FIGS. 3 and 4 may be suitably combined. Thus for example, in the embodiment shown in FIG. 3, the slave flip-flop circuit may be replaced by that shown in the embodiment of FIG. 4 or the master flip-flop circuit shown in FIG. 3 may be replaced by that shown in FIG. 4.

The details of FIGS. 3 and 4 are somewhat different. For example, in the master flip-flop circuit shown in FIG. 3, collector electrodes of transistor 103 of the input AND gate and of transistor 114 of the flip-flop circuit are connected together, whereas in the master flip-flop circuit shown in FIG. 4 collector electrodes of transistors 103 and 114 are separately grounded. With regard to the third current-switching logical circuit for performing flip-flop operation, in the embodiment shown in FIG. 3, this logical circuit comprises transistors 114 and 116 or by transistors 211 and 212 whereas in the embodiment shown in FIG. 4, the current-switching operation is effected between transistors 114 and 305 and between transistors 116 and 310 or between transistors 211 and 405 and between transistors 212 and 410. Further, in the embodiment shown in FIG. 3 the current-switching operation is effected directly between transistors 101 and 102 and transistor 103, whereas in the embodiment shown in FIG. 4 an emitter-follower transistor 302 is included between transistors 101, 102 and transistor 103. It will thus be clear that any particular construction of one embodiment may be replaced by a corresponding construction utilized in the other embodiment. Further, many other alternations and modifications may be permissible without departing from the spirit and scope of the invention as defined in the appended claims.

As has been described in detail in terms of a preferred embodiment, in the master-slave-type J—K flip-flop circuit, two outputs from the slave flip-flop circuit are used as the reference potentials for the master flip-flop circuit while two outputs from the master flip-flop circuits are used as the reference potentials for the slave flip-flop circuit. Furthermore, the contents of the master flip-flop circuit are determined by clock signals so that at the end of a clock pulse signal the content of the master flip-flop circuit is transferred to the slave flip-flop circuit.

What is claimed is:

1. A master-slave type J—K flip-flop circuit comprising:

a. a master flip-flop circuit including:

a first set input circuit having a current switching type logical circuit which performs an AND operation of an input $\overline{J}$ and a clock pulse $\overline{Cp}$ with reference to an output $\overline{Qs}$, a first reset input circuit having a current-switching type logical circuit which performs an AND operation of an input $\overline{K}$ and a clock pulse $\overline{Cp}$ with reference to an output Qs, and a first flip-flop circuit having at least one current-switching type logical circuit which performs a flip-flop operation responding to said first set and reset input circuits and which provides outputs Qm and $\overline{Qm}$ to a slave flip-flop circuit as a reference potential, b. said slave flip-flop circuit including:

a second set input circuit having a current-switching type logical circuit which executes current-switching operation of a clock pulse $\overline{Cp}$ in reference to an output $\overline{Qm}$, a second reset input circuit having a current switching type logical circuit which executes current-switching operation of the clock pulse $\overline{Cp}$ in reference to an output Qm, and a second flip-flop circuit having at least one current-switching type logical circuit which performs a flip-flop operation responding to said second set and reset input circuits, and which provides outputs Qs and $\overline{Qs}$ to said master flip-flop circuit as a reference potential, and which provides outputs Q and $\overline{Q}$ of said J—K flip-flop circuit.

2. A master-slave-type J—K flip-flop circuit according to claim 1, wherein said first and second flip-flop circuits each have a current-switching type logical circuit including first and second transistors which execute current-switching operations with reference to each other.

3. A master-slave-type J—K flip-flop circuit according to claim 1, wherein said first and second flip-flop circuits each have first and second current-switching type logical circuits each of which logical circuits includes first and second transistors which execute current-switching operations.

4. A master-slave-type J—K flip-flop circuit according to claim 1, wherein said first set and reset input circuits each have a first transistor to which the input is supplied and a second transistor to which is supplied the output of said slave flip-flop circuit as a reference potential.

5. A master-slave-type J—K flip-flop circuit according to claim 1, wherein said second set and reset input circuits each have a first transistor to which is supplied the clock pulse and a second transistor to which is supplied the output of said master flip-flop circuit as a reference potential.

6. A master-slave-type J—K flip-flop circuit according to claim 4, wherein said first and second transistors execute current switching operations.

7. A master-slave-type J—K flip-flop circuit according to claim 4, wherein said first set and reset circuits also include a third transistor to which is supplied the output of an emitter follower of its associated first transistor and which executes a current switching operation with its associated second transistor.

8. A master-slave-type J—K flip-flop circuit according to claim 5, wherein said first and second transistors execute current-switching operations.

* * * * *